US006881463B2

(12) United States Patent
Riccobene

(10) Patent No.: US 6,881,463 B2
(45) Date of Patent: Apr. 19, 2005

(54) IRREGULAR, ROTATIONAL TESSELLATION SURFACE COVERING UNITS AND SURFACE COVERING

(75) Inventor: Thomas S. Riccobene, Albuquerque, NM (US)

(73) Assignee: Riccobene Designs LLC, Albuquerque, NM (US)

( * ) Notice: Subject to any disclaimer, the term of this patent is extended or adjusted under 35 U.S.C. 154(b) by 71 days.

(21) Appl. No.: 10/395,537

(22) Filed: Mar. 24, 2003

(65) Prior Publication Data

US 2004/0191461 A1 Sep. 30, 2004

(51) Int. Cl.[7] .................................................. B32B 3/10

(52) U.S. Cl. .......................... 428/44; 428/48; 52/311.2; 404/41

(58) Field of Search ............................. 428/33, 44, 48, 428/49; 52/311.2; 404/41

(56) References Cited

U.S. PATENT DOCUMENTS

| | | | |
|---|---|---|---|
| 4,217,740 | A | 8/1980 | Assanti |
| 5,486,066 | A | 1/1996 | Hagenah |
| 5,524,396 | A | 6/1996 | Lalvani |
| 5,588,775 | A | 12/1996 | Hagenah |
| 5,597,591 | A | 1/1997 | Hagenah |
| 5,945,181 | A | 8/1999 | Fisher |
| 6,263,633 | B1 | 7/2001 | Hagenah |
| D480,819 | S | 10/2003 | Barbier |

FOREIGN PATENT DOCUMENTS

| | | |
|---|---|---|
| DE | 4232300 | 3/1994 |
| DE | 4333942 | 4/1995 |
| DE | 10001967 | 7/2001 |
| WO | 0153612 | 7/2001 |

OTHER PUBLICATIONS

Concrete Landscaping/PRODUCTS; Old Castle Brochure; Published 2002.

(List continued on next page.)

*Primary Examiner*—Alexander S. Thomas
(74) *Attorney, Agent, or Firm*—Greer, Burns & Crain, Ltd.

(57) ABSTRACT

A surface covering unit comprises x primary elements, wherein x is an integer equal to or greater than 1. Each primary element is a rotational tessellation having a plural pairs of sides extending in a generally radial direction from plural vertices, respectively. In each pair, the two sides are rotationally spaced by an angle of 60, 90, 120 or 180 degrees, and each side is substantially a rotational image of the other side. The sum of the plural vertices angles is 180, 240, 270, 300 or 360 degrees. Preferably, all of the sides are irregularly shaped, but one or more sides could be wholly or partially straight. Optionally, one or more edges of each unit are marked with indicia to facilitate matching mating sides of adjacent units. A wide variety of units may be constructed having different numbers and arrangements of primary elements. As all the units are combinations of primary elements, they readily mate with each other. A surface covering comprises a multiplicity of surface covering units assembled to form a continuous surface without overlap between units and without substantial gaps between units. Because of the irregular side configurations, and different sizes and shapes of individual units, one can construct a continuous surface that has a natural, random and apparent custom appearance. Optionally, minor surface and edges variations are made from unit to unit to further enhance the natural appearance of the surface covering.

21 Claims, 13 Drawing Sheets

OTHER PUBLICATIONS

Retaining Walls; Pavestone Brochure Published 2002.

Beautiful Edgers; Pavestone Brochure Published 2002.

Nature Walk™ Natural Flagstone Appeal for Pedestrian Traffic 2001.

Website: www.sf–kooperation.de/english/index Canteon®: CIS 300–10; Pentalith 7/2001.

Designing Tessellations: The Secrets of Interlocking Patterns: Author: Jinny Beyer: Chapter 7: The Keys to Creating Interlocking Tessellations: p. 125–153 1999.

Website: www.riverdeep.net/products/other/tesselmania.jhtml TesselMania ! Deluxe 6/03.

Website: www.learningcompanyschool.com TesselMania! Deluxe 6/03.

Website: www.geckostone.com Geckostone™ 3/03.

Website: www.matfcrete.net/RandonStone.htm MAT-CRETE The Ultimate in Concrete Design 12/02.

Website: www.superstone.com SPLIT ROCK 12/02.

Website: www.mathforum.org/sum95.suzanne/whattess.html What is Tessellation? 4/02.

IRREGULAR, ROTATIONAL TESSELLATION SURFACE COVERING UNITS AND SURFACE COVERING

FIELD OF THE INVENTION

This disclosure relates to repeating elements forming a surface covering, and more specifically to stones, bricks, pavers and tiles for forming surface coverings.

BACKGROUND OF THE INVENTION

It is well known and established to cover surfaces, such as walkways, driveways, patios, floors, work surfaces, walls and other interior or exterior surfaces with stones, bricks, pavers, tiles and other architectural surface covering units. Natural stone surface coverings are constructed by fitting together irregularly sized and shaped flat stones, such as flagstone and slate. The work requires a skilled stonemason to select, cut and fit the stones. It is labor intensive, and accordingly expensive. Custom built natural stone surfaces, however, are very attractive and desirable.

Another conventional surface covering is constructed of manufactured pavers, bricks or tiles. Manufactured pavers are typically provided in geometric shapes, such as squares, rectangles and hexagons, or combinations thereof. Surfaces covered with manufactured pavers typically are laid in repeating patterns, such as, "herring-bone." Alternatively, it is known to lay conventional pavers in random, non-repeating patterns. Random patterns are regarded as esthetically pleasing and are becoming more popular. However, random patterns of manufactured bricks do not have the degree of natural irregularity that is desirable in custom stone walkways, driveways, patios and the like.

SUMMARY OF THE INVENTION

According to the present invention there is provided irregular surface covering units, each unit comprising one or more primary rotational tessellation elements. The primary element has a first side extending in a generally radial direction relative to a first vertex, the first side being irregularly shaped; a second side extending in a generally radial direction relative to the first vertex and being rotationally spaced from the first side by an angle θ where θ is 60, 90, 120 or 180 degrees, the second side being a rotational image of the first side; and a transverse side extending between the first and the second sides, the transverse side being irregularly shaped. The transverse side includes a third side and a fourth side extending generally radially relative to a second vertex, the third and fourth sides being rotationally spaced by an angle ϕ. The sum of angles θ and ϕ is 180, 240, 270 or 300 degrees. Preferably all the sides are irregularly shaped, but optionally, one or more sides could include a straight portion or regular geometric curves.

Preferred embodiments of the surface covering units of the invention have primary elements having three vertices. First and second sides extend radially from the first vertex and are rotationally spaced one from the other by an angle θ, as described above. Third and fourth sides extend radially from the second vertex and are rotationally spaced by an angle ϕ. Fifth and sixth sides extend radially from a third vertex and are rotationally spread by an angle γ. The sum of angles, θ, ϕ and γ is 360 degrees. All sides are preferably irregularly shaped. Preferred angles of rotation are set forth herein below.

A second aspect of the invention is a surface covering. The covering comprises a multiplicity of surface covering units assembled to form a continuous surface without overlap between units and without substantial gaps between units. Each unit is comprised of x primary elements, where x is an integer equal to or greater than 1, preferably 1 to 6. The primary element is an irregular rotational tessellation as described above. A wide variety of units may be constructed having different numbers and arrangements of primary elements. Because all the units are combinations of primary elements, they readily mate with each other. As a result of the irregular side configurations, and different sizes and shapes of individual units, one can construct a continuous surface that has a natural, random and apparent custom appearance.

A third, optional aspect of the invention is providing indicia on or adjacent one or more sides of each unit to assist in construction of surface coverings. One preferred indicia comprises a projection on lower portion of one side of each unit and a corresponding recess in the mating side of the unit. For example, a first side of each unit can be provided with a V-shaped recess to receive a V-shaped projection from the second side of another unit. Further, the third side of each unit can be provided with a semi-circular projection adapted to be received in a corresponding semi-circular recess in the fourth side of another unit. Thereby, a person constructing a surface covering may readily match and mate first-second sides and third-fourth sides. Other forms of indicia on the sides or bottoms of units may be used to facilitate construction. The indicia may also assist in uniformly spacing the units to maintain surface integrity over large areas.

A fourth, optional aspect of the invention is to vary the appearance of each unit to further enhance the natural appearance of the surface covering. Variations include edge, surface and color variations. Edge variations may be created by introducing small variations in mating sides of the units. For example, the first and second sides are images of one another so that the first side of one unit will mate with the second side of another unit. If small variations are made in one of the sides of each unit, as compared to its mating side, the line or gap between mating side edges will vary in thickness, lending a more natural appearance. The variations should not be great, however, to avoid problems in matching and mating side edges. Other variations from unit to unit may be made by tumbling the units, hammering the top and side surfaces of the units, and/or by adding dyes in varying amounts to the concrete or other materials from which the units are made.

The foregoing and other aspects and features of the invention will become apparent to those of reasonable skill in the art from the following detailed description, as considered in conjunction with the accompanying drawings.

BRIEF DESCRIPTION OF THE DRAWINGS

FIG. 1 is a plan view of a first surface covering of the first embodiment.

FIG. 2 is an enlarged plan view of a first surface covering unit of the first embodiment.

FIG. 3 is a plan view of a second surface covering of the first embodiment.

FIG. 4 is an enlarged plan view of a second surface covering unit of the first embodiment.

FIG. 5 is a plan view of a third surface covering of the first embodiment.

FIG. 6 is an enlarged plan view of a third surface covering unit of the first embodiment.

FIG. 7 is a plan view of a fourth surface covering of the first embodiment.

FIG. 8 is an enlarged plan view of a fourth surface covering unit of the first embodiment.

FIG. 9 is an enlarged plan view of a fifth surface covering unit of the first embodiment.

FIG. 10 is an enlarged plan view of a sixth surface covering unit of the first embodiment.

FIG. 11 is an enlarged plan view of a first surface covering unit of the second embodiment.

FIG. 12 is a plan view of a second surface covering unit of the second embodiment.

FIG. 13 is a plan view of a third surface covering unit of the second embodiment.

FIG. 14 is a plan view of a fourth surface covering unit of the second embodiment.

FIG. 15 is a plan view of a fifth surface covering unit of the second embodiment.

FIG. 16 is a plan view of an exemplary surface covering of the second embodiment.

FIG. 17 is an enlarged plan view of a first surface covering unit of the third embodiment.

FIG. 18 is a plan view of a second surface covering unit of the third embodiment.

FIG. 19 is a plan view of a third surface covering unit of the third embodiment.

FIG. 20 is a plan view of a fourth surface covering unit of the third embodiment.

FIG. 21 is a plan view of a fifth surface covering unit of the third embodiment.

FIG. 22 is a plan view of an exemplary surface covering of the third embodiment.

FIG. 23 is an enlarged plan view of a first surface covering unit of the fourth embodiment.

FIG. 24 is a plan view of a second surface covering unit of the fourth embodiment.

FIG. 25 is a plan view of a third surface covering unit of the fourth embodiment.

FIG. 26 is a plan view of a fourth surface covering unit of the fourth embodiment.

FIG. 27 is a plan view of an exemplary surface covering of the fourth embodiment.

DETAILED DESCRIPTION OF THE PREFERRED EMBODIMENTS

Preferred embodiments of the present invention are described below by way of example only, with reference to the accompany drawings.

Figure 1:
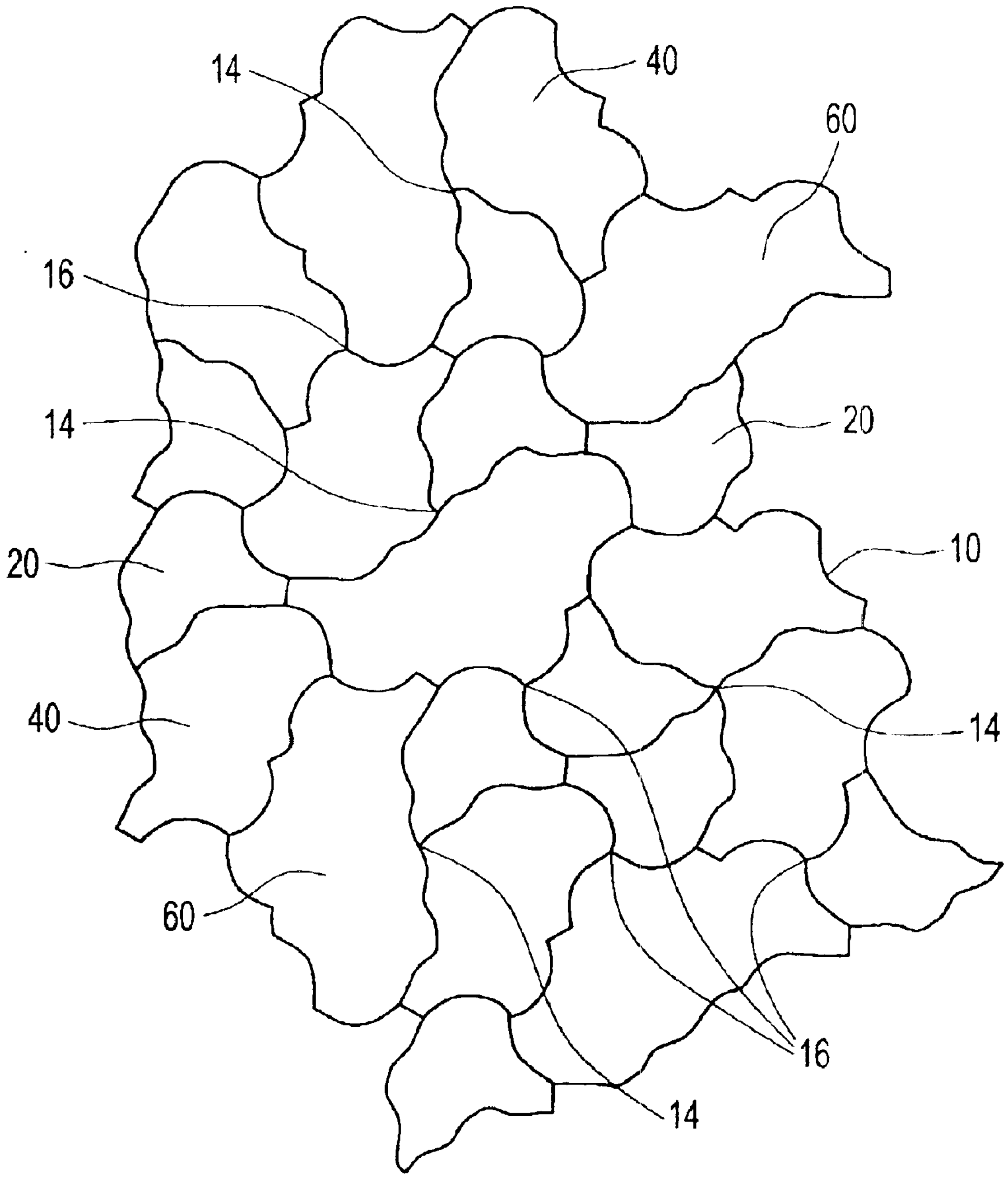
FIGS. 1–10 are illustrations of surface covering units and exemplary surface coverings derived from a first embodiment of a rotational tessellation element of the invention.

FIG. 1 shows a surface covering 10 constructed in accordance with the present invention. Surface covering 10 comprises an arrangement of surface covering units without substantial gaps or overlapping. The term "substantial gaps" means comparatively large gaps or spaces that would detract from the appearance of the covered surface. The term, "without substantial gaps" means no gaps and/or comparatively small gaps that may be filled with sand or mortar, which do not adversely detract from the appearance of the surface covering. For the purposes of this application, the term "unit" means any surface covering unit, including but not limited to pavers, bricks, tiles, surface molding stamps and other architectural units suitable for use in the construction of floors, work surfaces, walls or other interior or exterior surface coverings. Surface covering units may be molded or otherwise made of concrete, stone, ceramics, plastic, natural or synthetic rubber, glass or other suitable material, or combinations thereof. In this embodiment, surface covering 10 is comprised of three different sized units 20, 40 and 60. The units have what appear to be irregular configurations. Further, the surface covering 10 has the appearance of a natural, custom stone surface.

Figure 2:
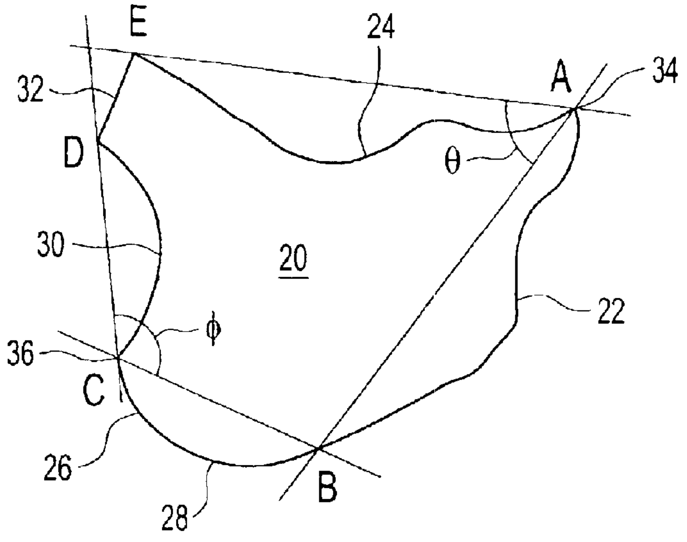

An enlarged view of unit 20 is shown in FIG. 2. The unit comprises a single primary element 20 of a rotational tessellation as will be described in greater detail below. Primary element 20 has a first side 22 extending between points A and B. Second side 24 extends between points A and E. A transverse side 26 extends between points B and E. Transverse side 26 preferably comprises a series of segments, namely, a third side 28 extending between points B and C, a fourth side 30 extending between points C and D, and an optional fifth side 32 extending between points D and E. First 22 and second 24 sides are images of one another. The term "images" means they have substantially the same shape, that is, the lines formed by sides 22 and 24 have substantially the same configuration so that side 22 on one unit will mate with side 24 of another unit. Further, the first and second sides extend radially relative to a common first vertex 34, and are rotationally spaced by an angle $\theta$. Angle $\theta$ is derived from the formula $360°/n$ where the variable n is an integer selected from the group of 2, 3, 4 or 6. Thus, angle $\theta$ is 60, 90, 120 or 180 degrees. In the example shown in FIG. 2, the variable n is equal to 6 and $\theta$ is 60 degrees. The third 28 and fourth 30 sides have the same shape, a common second vertex 36, and are rotationally spaced by an angle $\phi$. Angle $\phi$ is derived from the formula $360°/m$ where the variable m is an integer, and the sum of angle $\theta$ and $\phi$ is 180, 240, 270 or 300 degrees. In the example shown in FIG. 2, variable m is 3 and $\phi$ is 120°. The fifth side 32 is optional, that is, the third and fourth sides could extend between points B and E, and thereby complete the circumference of the unit. The fifth side is a substantially straight line in this embodiment.

The first 22 and second 24 sides are irregular. The term "irregular" means that the sides are not straight lines, circular arcs, or other simple geometric shapes. Because first side 22 and second side 24 have substantially the same irregular shape, the first side of one unit will mate with a second side of another unit. Further, because the angle θ is defined as 360°/n, n units may be arranged in a rotational tessellation about first vertex 34. Similarly, because the angle ϕ is defined as 360°/m, m units maybe arranged in a rotational tessellation about second vertex 36.

Figure 3:
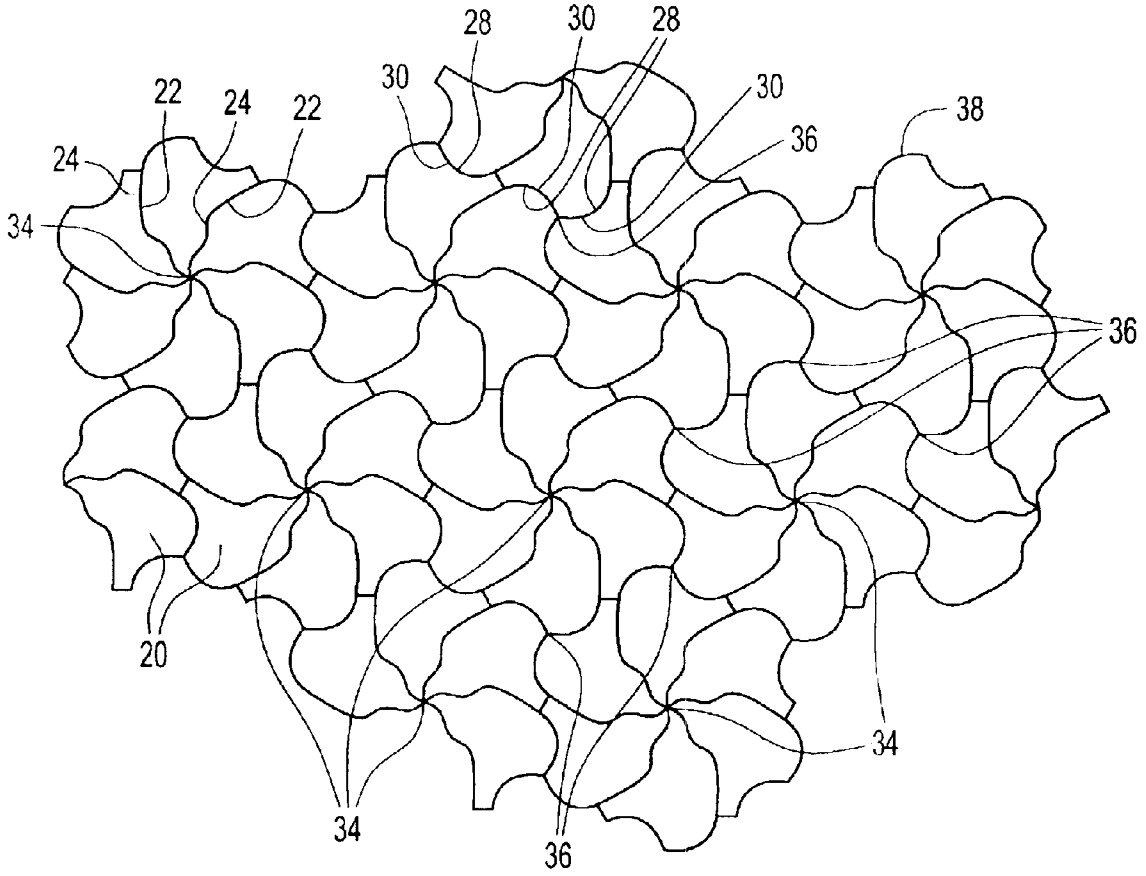

FIG. 3 illustrates a surface covering 38 formed of a multiplicity of units 20. The first sides 22 match and mate with second sides 24 of adjacent units. In an analogous fashion, third sides 28 match and mate with fourth sides 30 of adjacent units. Fifth sides mate with each other. In the embodiment shown in FIG. 3, six units form a complete rotational tessellation about first vertex points 34. Further, three units form a complete rotational tessellation about second vertex points 36.

Figure 4:
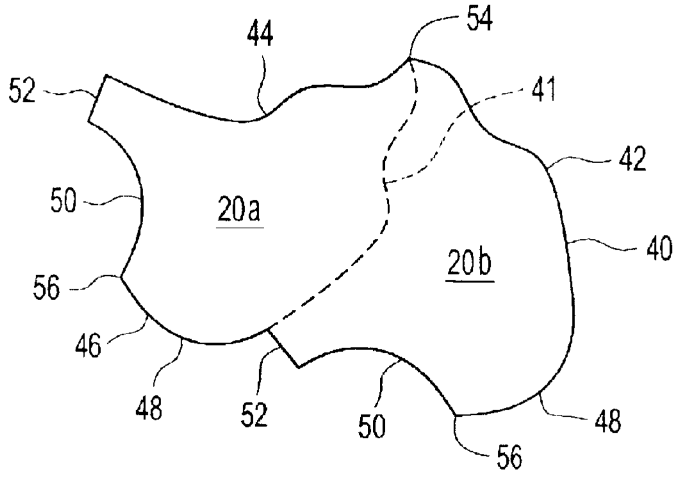

FIG. 4 illustrates a second, medium size unit 40. Unit 40 comprises two primary elements 20*a* and 20*b* as indicated by broken line 41. Unit 40 has sides that match unit 20, namely, a first side 42, second side 44, and transverse side 46 having third sides 48, fourth sides 50 and fifth sides 52. Unit 40 further includes a first vertex 54 and two second vertices 56. In unit 40, the variable n is 3 and the angle θ between first side 42 and second side 44 is 120°. As in unit 20, the variable m is three and ϕ is 120 degrees.

Figure 5:
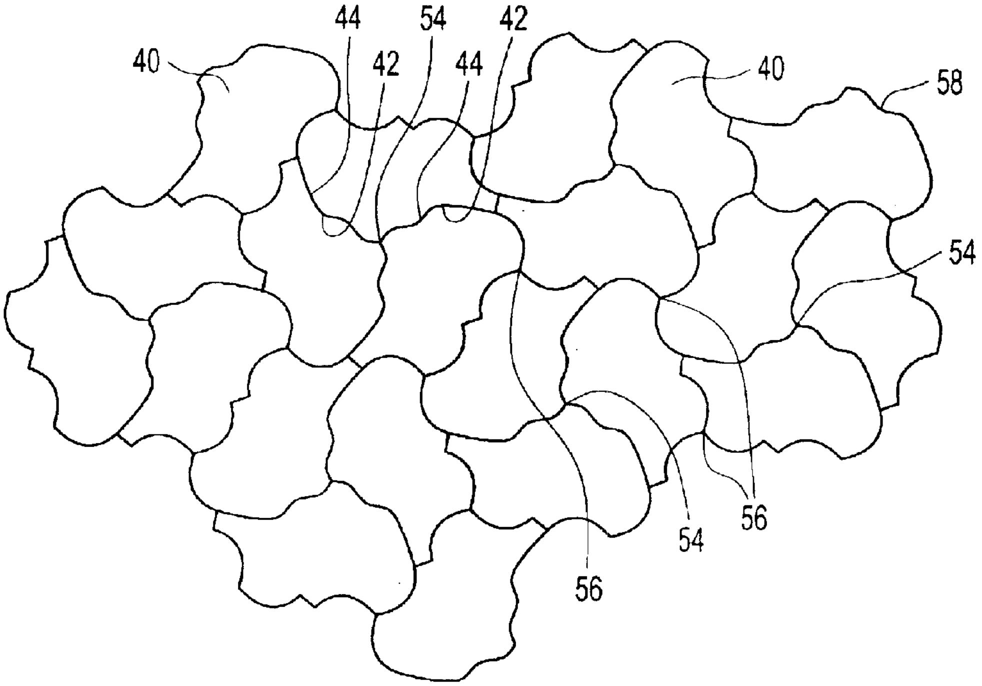

FIG. 5 illustrates a surface covering 58 comprised entirely of second units 40. Three units 40 complete a rotational tessellation about vertex 54. Three units 40 also comprise a complete rotational tessellation about second vertex 56.

Figure 6:
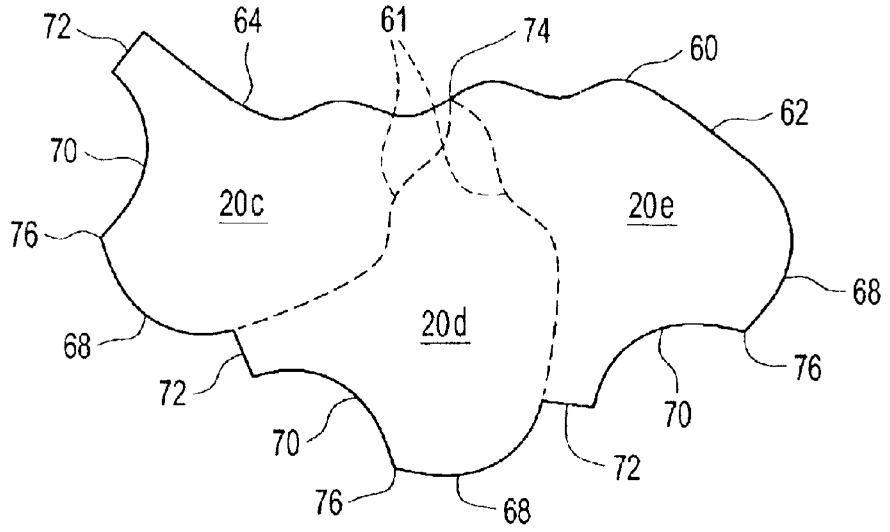

FIG. 6 illustrates a third or large unit 60, comprising three primary elements 20*c*, 20*d* and 20*c* as shown by broken lines 61. Unit 60 has sides that match units 20 and 40, namely first side 62, second side 64, third sides 68, fourth sides 70, and fifth sides 72. Unit 60 further includes a first vertex 74 and second vertices 76. In unit 60, the variable n is two and the angle θ between the first side 62 and second side 64 is 180 degrees. As in units 20 and 40, variable m is 3 and angle ϕ is 120 degrees.

Figure 7:
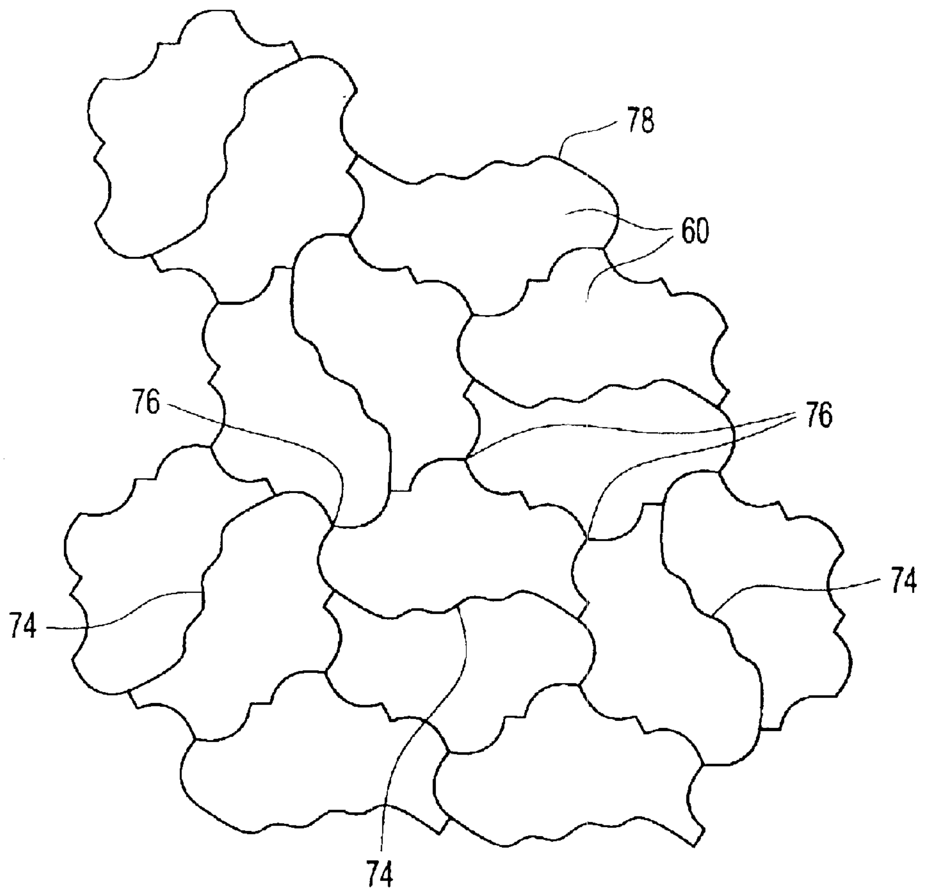

FIG. 7 illustrates the surface covering 78 comprised entirely of third units 60. Two units 60 complete a rotational tessellation about first vertex 74. Three units 60 complete a rotational tessellation about second vertices 76.

Figure 8:
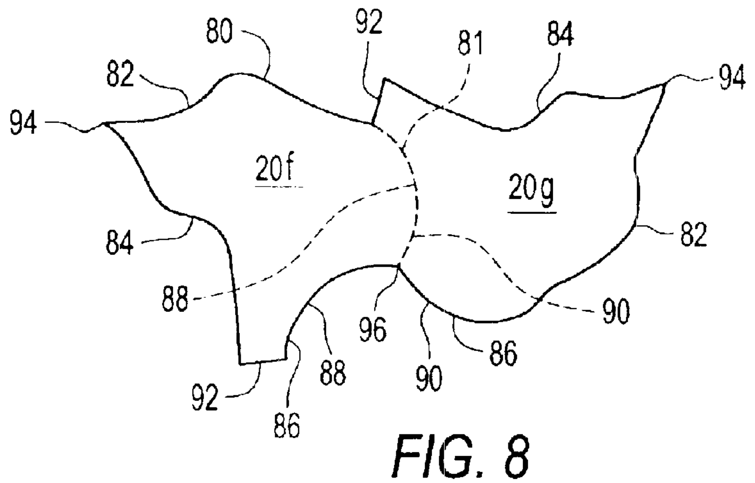
Figure 9:
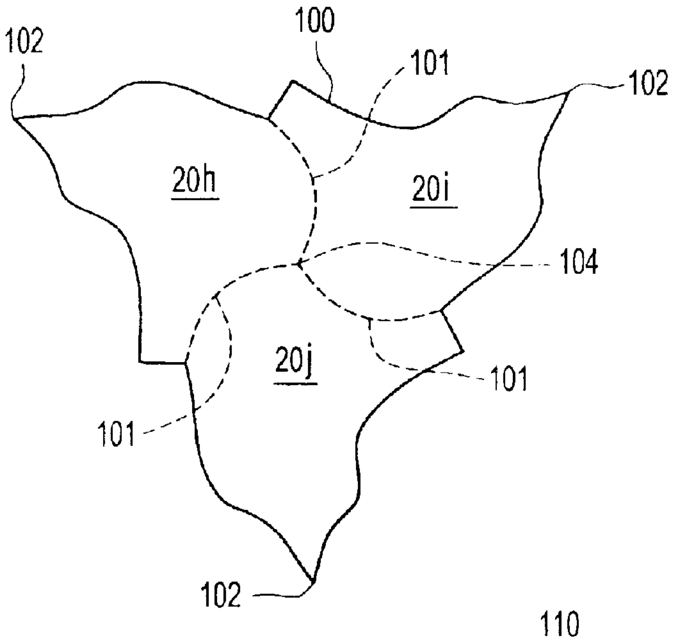
Figure 10:
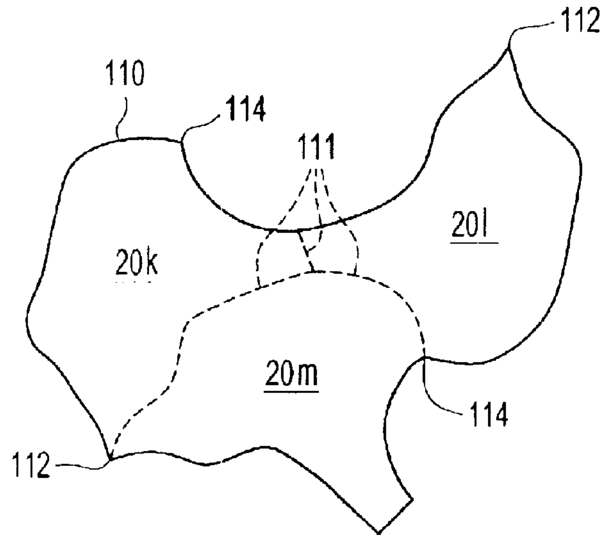

FIGS. 8–10 illustrate how surface covering units may be made of different sizes and shapes by combining primary elements 20. In FIG. 8, unit 80 comprises two elements 20*f* and 20*g*, as reflected by dashed line 81. Unit 80 has two first sides 82, two second sides 84, a third side 88, fourth side 90, and two fifth sides 92. Unit 80 has two first vertices 94 and a single second vertex 96.

FIG. 9 illustrates another unit embodiment 100 comprising three primary elements 20*h*, 20*i* and 20*j*, as shown by broken lines 101, that are rotationally tessellated about second vertex 104. Unit 100 has three first vertices 102.

FIG. 10 illustrates yet another embodiment 110 comprising three primary elements 20*k*, 20*l* and 20*m* as shown by broken lines 111. Unit 110 has two first vertices 112 and two second vertices 114. As will be appreciated by persons skilled in the art, additional units may be formed in other combinations of primary elements 20. The embodiments shown in FIGS. 8–10 are not ideal for construction of concrete pavers due to sharp edges or narrow mid-sections, but are presented to illustrate the concept of different irregular shaped units formed by different combinations of primary elements.

Returning to FIG. 1, one can visualize a plurality of units rotationally tessellated about each first vertex 14 and each second vertex 16. Each rotational tessellation may contain one or more small 20, medium 40 or large 60 units, or a combination thereof. Because of the irregularly shaped sides of each unit and the size variations among the units, the surface appears to be natural and custom fitted, that is, a regular geometric pattern is not readily apparent. Although the embodiment of FIG. 1 has three different size units, namely, single, double and triple element units, it is contemplated that numerous variations are possible, including, for example, a combination of only units 20 and 40, or a combination of only units 40 and 60. Further, it is contemplated that a surface covering could include units 80, 100 or 110, or any other units comprised of a combination of primary elements.

Figure 11:
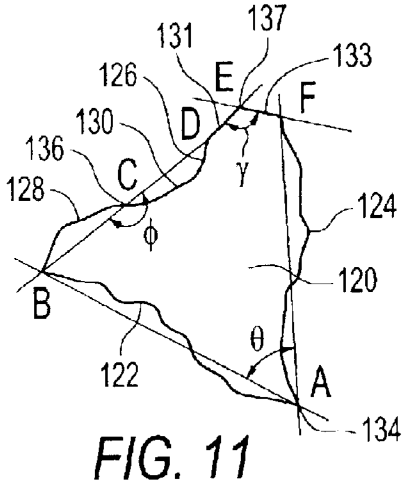
FIGS. 11–16 are illustrations of surface covering units and an exemplary surface covering derived from a second embodiment of a rotational tessellation element of the invention.

FIGS. 11–16 illustrate surface covering units and an exemplary surface covering derived from a second embodiment of a rotational tessellation element of the invention. FIG. 11 shows a primary element 120 comprised of six sides, namely, first side 122 extending between points A and B, second side 124 extending between points A and F, third side 128 extending between points B and C, fourth side 130 extending between points C and D, fifth side 131 extending between sides D and E and sixth side 133 extending between points E and F. Together, sides 3 to 6 form transverse side 126. Element 120 has three vertices, namely, first vertex 134, second vertex 136, and third vertex 137. First 122 and second 124 sides are images of one another, radiate from first vertex 134, and are rotationally spaced by an angle θ of 60 degrees. The third 128 and fourth 130 sides are images of one another, radiate from second vertex 136 and are rotationally spaced by an angle ϕ of 180 degrees. Fifth 131 and sixth 133 sides are images of one another, radiate from third vertex 137 and are rotationally spaced by an angle γ of 120 degrees. All six sides are preferably irregular in shape.

Figure 12:
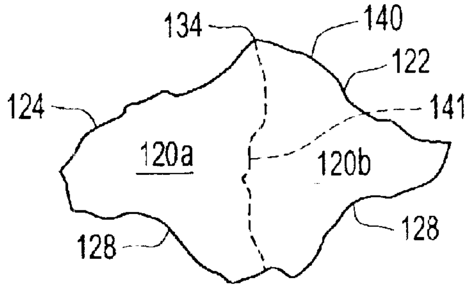

FIG. 12 illustrates a unit 140 comprised of two basic elements 120*a* and 120*b* as indicated by broken lines 141. Elements 120*a* and 120*b* are adjacent elements in a rotation about first vertex 134. The basic elements are joined at an interface of first and second sides.

Figure 13:
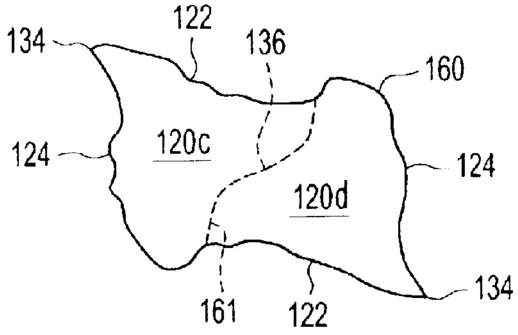

FIG. 13 illustrates a unit 160 comprised of two basic elements 120*c* and 120*d* as indicated by broken line 161. The basic elements are joined at an interface of sides three and four. Elements 120*c* and 120*d* share a second vertex 136.

Figure 14:
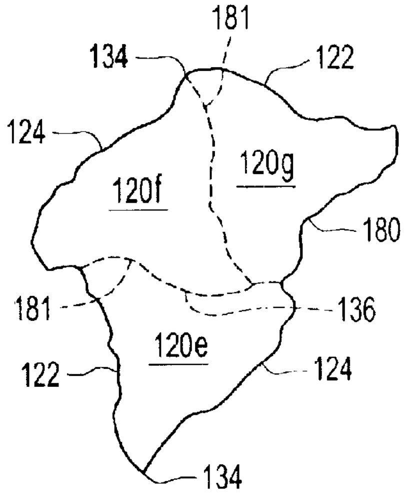

FIG. 14 illustrates a unit 180 comprised of three basic elements 120*e*, 120*f* and 120*g* as indicated by broken lines 181. Elements 120*f* and 120*g* are joined along first-second sides interfaces and share a common first vertex 134. Elements 120*e* and 120*f* are joined at third-fourth side interfaces and share a common second vertex 136.

Figure 15:
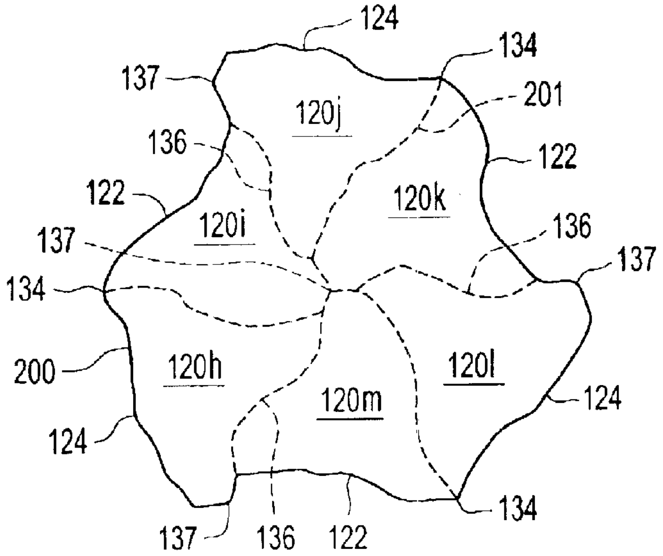

FIG. 15 illustrates a unit 200 comprised of six basic elements 120*h–m* as indicated by broken lines 201. First 134, second 136 and third vertices 137 are identified in FIG. 15. As one may observe, unit 200 comprises a pair of primary elements from three different rotations about first vertices 134.

FIGS. 12–15 thus illustrates four ways that basic elements may be combined to form different size and shape units. Additional units may be formed by other combinations of primary element 120.

Figure 16:
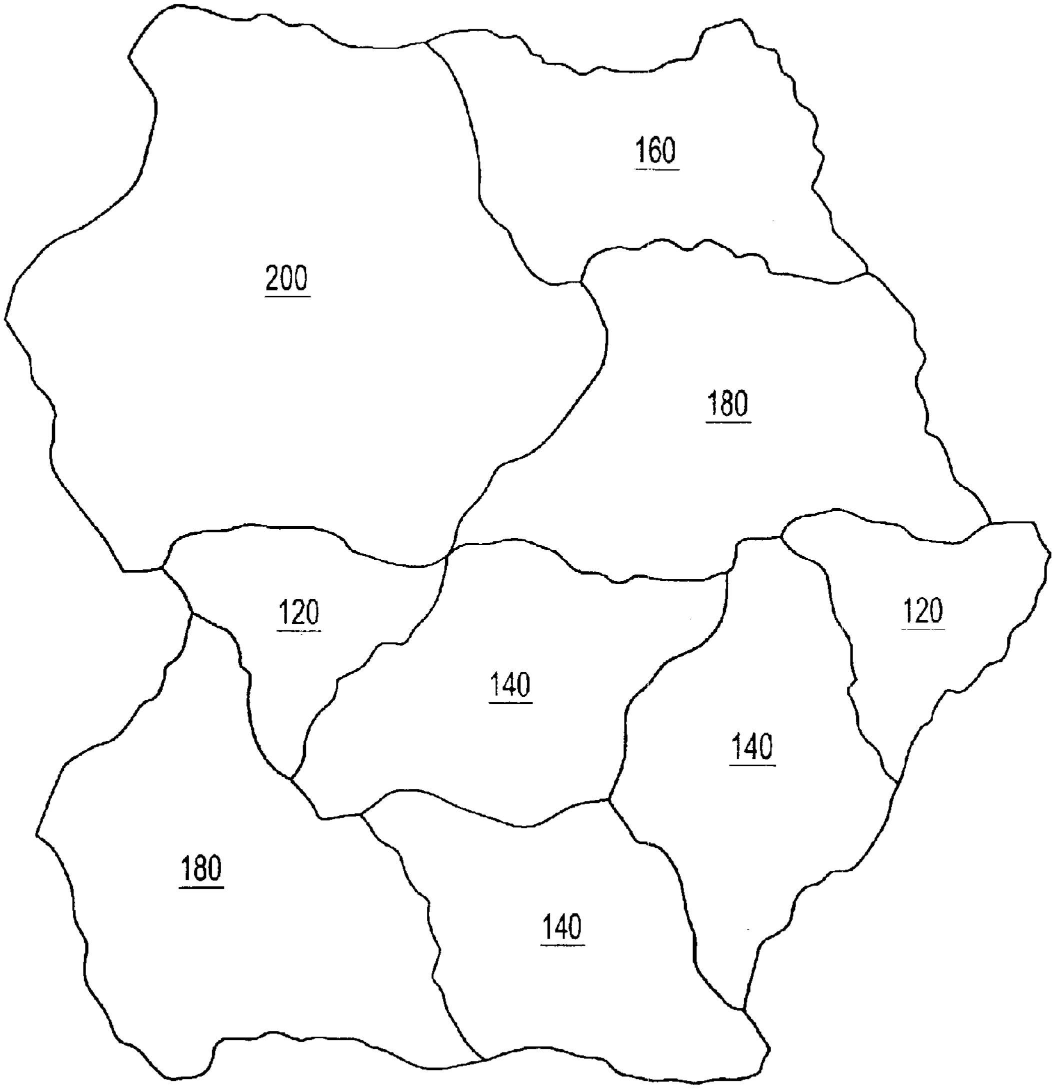

FIG. 16 illustrates an exemplary surface covering formed of the units illustrated in FIGS. 11–15. A great variety of surface coverings may be formed utilizing combinations of units 120, 140, 160, 180 and 200, as well as other units formed from different combinations of primary elements of the second embodiment.

FIGS. 17–22 illustrate surface covering units and an exemplary surface covering of a third embodiment of the rotational tessellation element of the invention.

Figure 17:
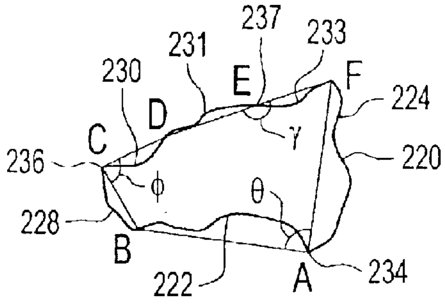
FIGS. 17–22 are illustrations of surface covering units and an exemplary surface covering derived from a third embodiment of a rotational tessellation element of the invention.

FIG. 17 illustrates a primary element 220 of the third embodiment. Primary element 220 has a first side 222 extending between points A and B, a second side 224 extending between points A and F. The second side 224 is a rotated image of first side 222 about first vertex 234. The angle θ of rotation is 90 degrees in the third embodiment. Basic element 220 further includes third side 228 extending between points B and C and fourth side 230 extending between points C and D. Fourth side 230 is a rotated image of third side 228 about second vertex 236. The angle of rotation between sides three and four is angle ø which in case of the third embodiment is 90°. Basic element 220 further comprises a fifth side 231 extending between points D and E, and a sixth side 233 extending between points E and F. Sixth side 233 is a rotated image of fifth side 231 about third vertex 237. The angle of rotation therebetween, γ is 180 degrees.

Figure 18:
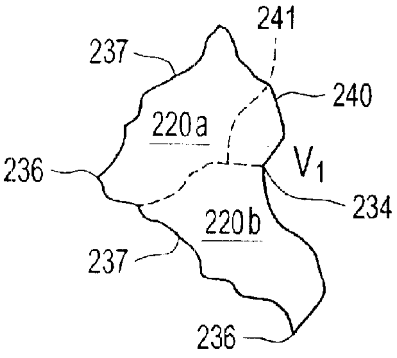

FIG. 18 illustrates a unit 240 comprised of two primary elements 220*a* and 220*b* as indicated by broken lines 241. Primary elements 220*a* and 220*b* are joined at the interface between sides one and two of the respective units, and share a common first vertex 234.

Figure 19:
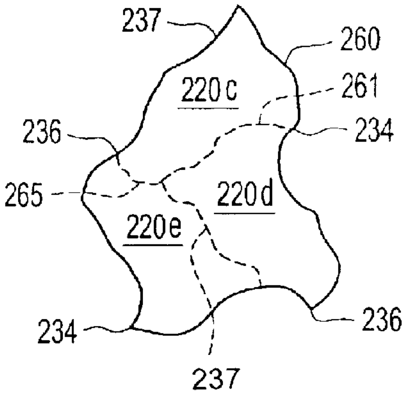

FIG. 19 is a third unit 260 comprised of three primary elements 220*c*, 220*d* and 220*e* as indicated by broken lines 261. Elements 220*c* and 220*d* are joined at the interface of sides one and two of adjacent elements, and have a common first vertex 234. Element 220*e* is joined to element 220*d* at the interface between sides five and six, respectively, and share common third vertex 237. Element 220*e* is joined to element 220*c* at the interface between sides three and four, respectively and share common second vertex 236.

Figure 20:
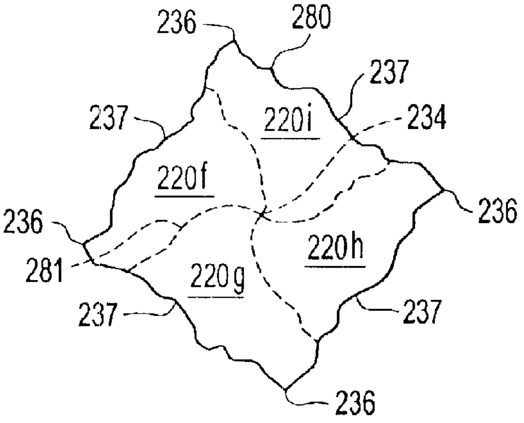

FIG. 20 illustrates a unit 280 comprised of four primary elements from the third embodiment, namely elements 220*f*, 220*g*, 220*h* and 220*i* as indicated by broken lines 281. All four elements revolve around first vertex 234.

Figure 21:
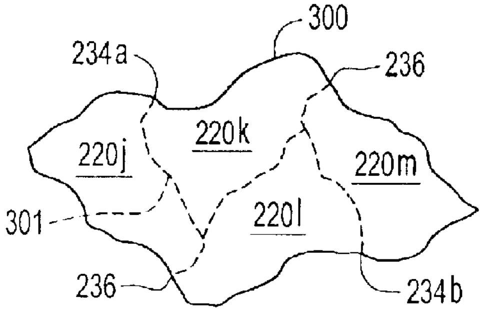

FIG. 21 illustrates a fifth unit 300 comprised of four primary elements 220*j–m*, as indicated by broken lines 301. In unit 300 two elements 220*j* and 220*k* are taken from a rotation about first vertex 234*a*. Elements 220*l* and 220*m* comprise adjacent elements about first vertex 234*b*.

Figure 22:
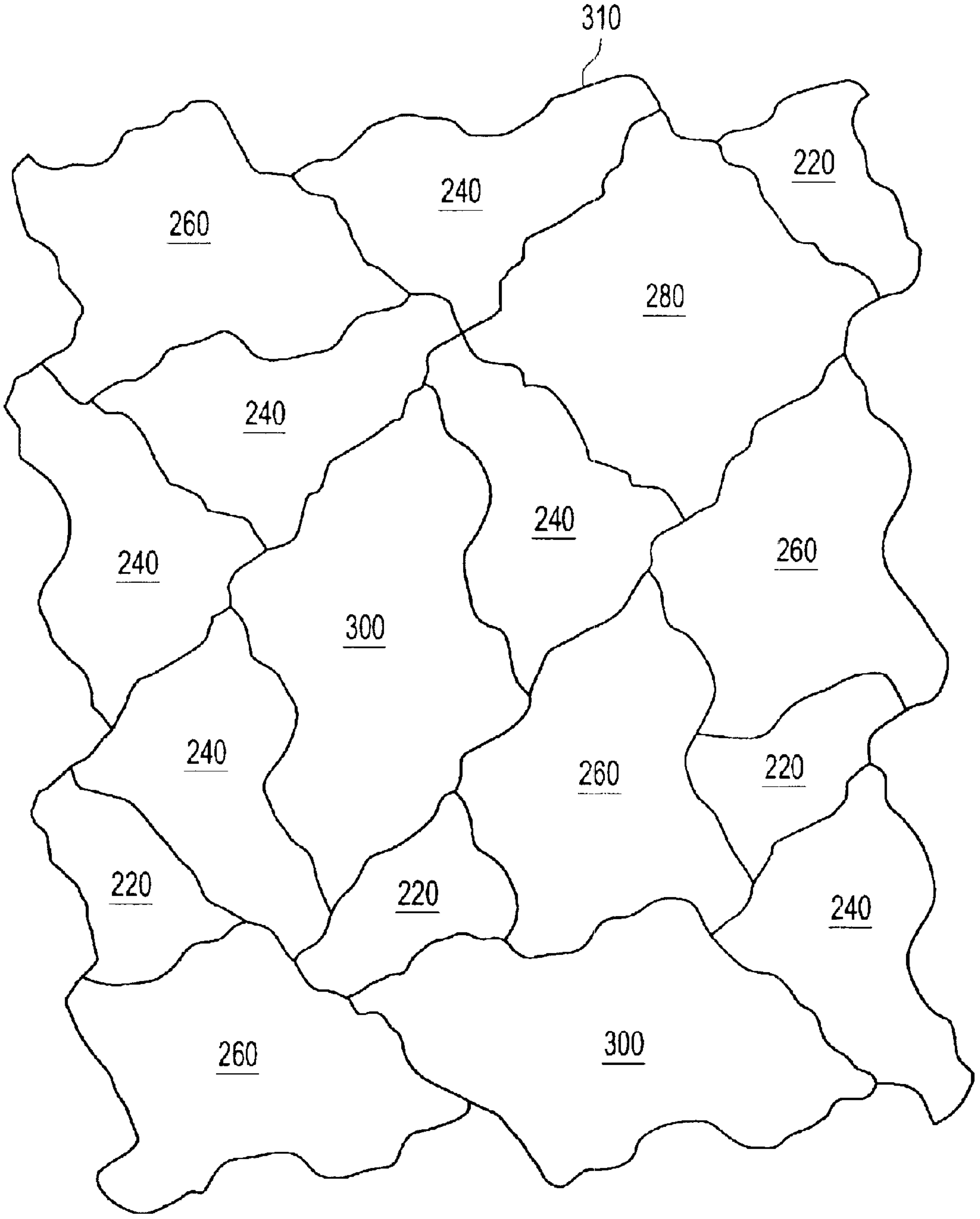

FIG. 22 illustrates a surface covering formed from a mixture of units 220, 240, 260, 280, 300. As with the other embodiments, the surface covering appears to be irregular, natural and custom made.

FIGS. 23–27 illustrate surface covering units and a surface covering of a fourth embodiment of the rotational tessellation element of the invention.

Figure 23:
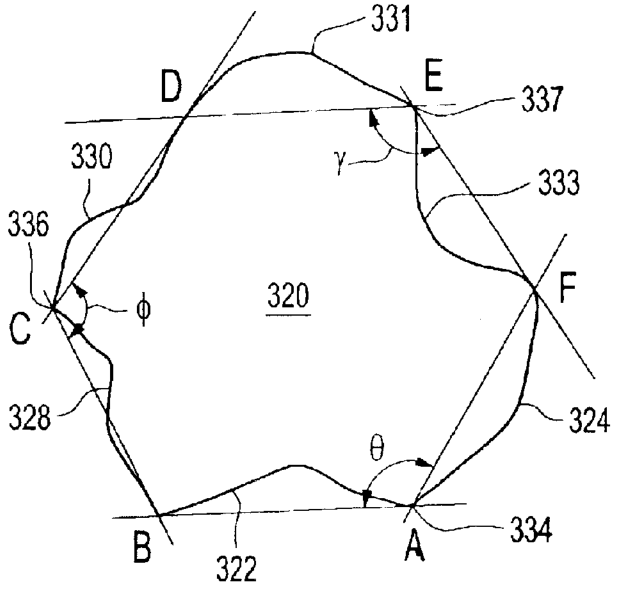
FIGS. 23–27 are illustrations of surface covering units and an exemplary surface covering derived from a fourth embodiment of a rotational tessellation element of the invention.

FIG. 23 illustrates a primary element 320 of the fourth embodiment. Primary clement 320 has a first side 322 extending between points A and B, a second side 324 extending between points A and F. The second side 324 is a rotated image of first side 322 about first vertex 334. The angle θ of rotation is 120 degrees in the fourth embodiment. Basic element 320 further includes a third side 328 extending between points B and C and a fourth side 330 extending between points C and D. Fourth side 330 is a rotated image of third side 328 about second vertex 336. The angle of rotation between sides 3 and 4 is an angle ϕ, which in the case of the fourth embodiment is 120 degrees. Basic element 320 further comprises a fifth side 331 extending between points D and E, and a sixth side 333 extending between points E and F. Sixth side 333 is a rotated image of fifth side 331, about third vertex 337. The angle of rotation therebetween, γ is 120 degrees.

Figure 24:
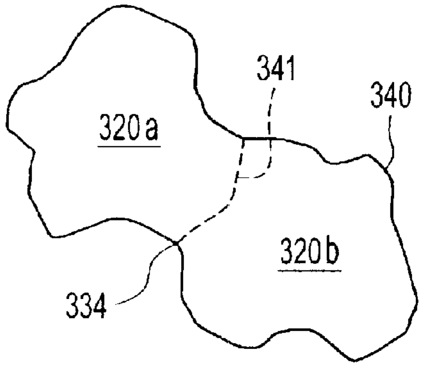

FIG. 24 illustrates a unit 340 comprised of two primary elements 320*a* and 320*b* as indicated by broken line 341. Basic elements 320*a* and 320*b* are joined at the interface between sides one and two of adjacent elements, and share a common first vertex 334.

Figure 25:
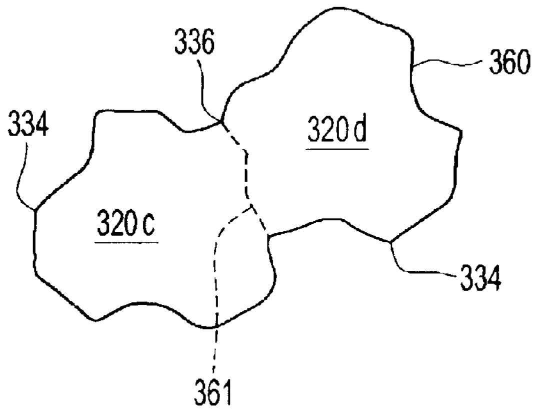

FIG. 25 is a third unit 360 comprised of two primary elements 320*c* and 320*d*, as indicated by broken line 361. Elements 320*c* and 320*d* are joined at the interface of sides three and four of respective elements, and have a common second vertex 336.

Figure 26:
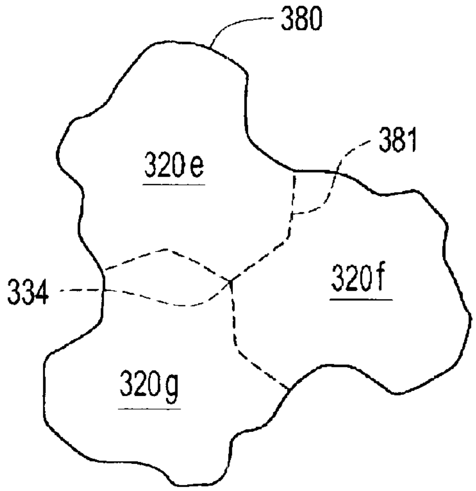

FIG. 26 illustrates a unit 380 comprised of three primary elements from the fourth embodiment, namely, elements 320*e*, 320*f* and 320*g*, as indicated by broken line 381. All three elements revolve around first vertex 334.

Figure 27:
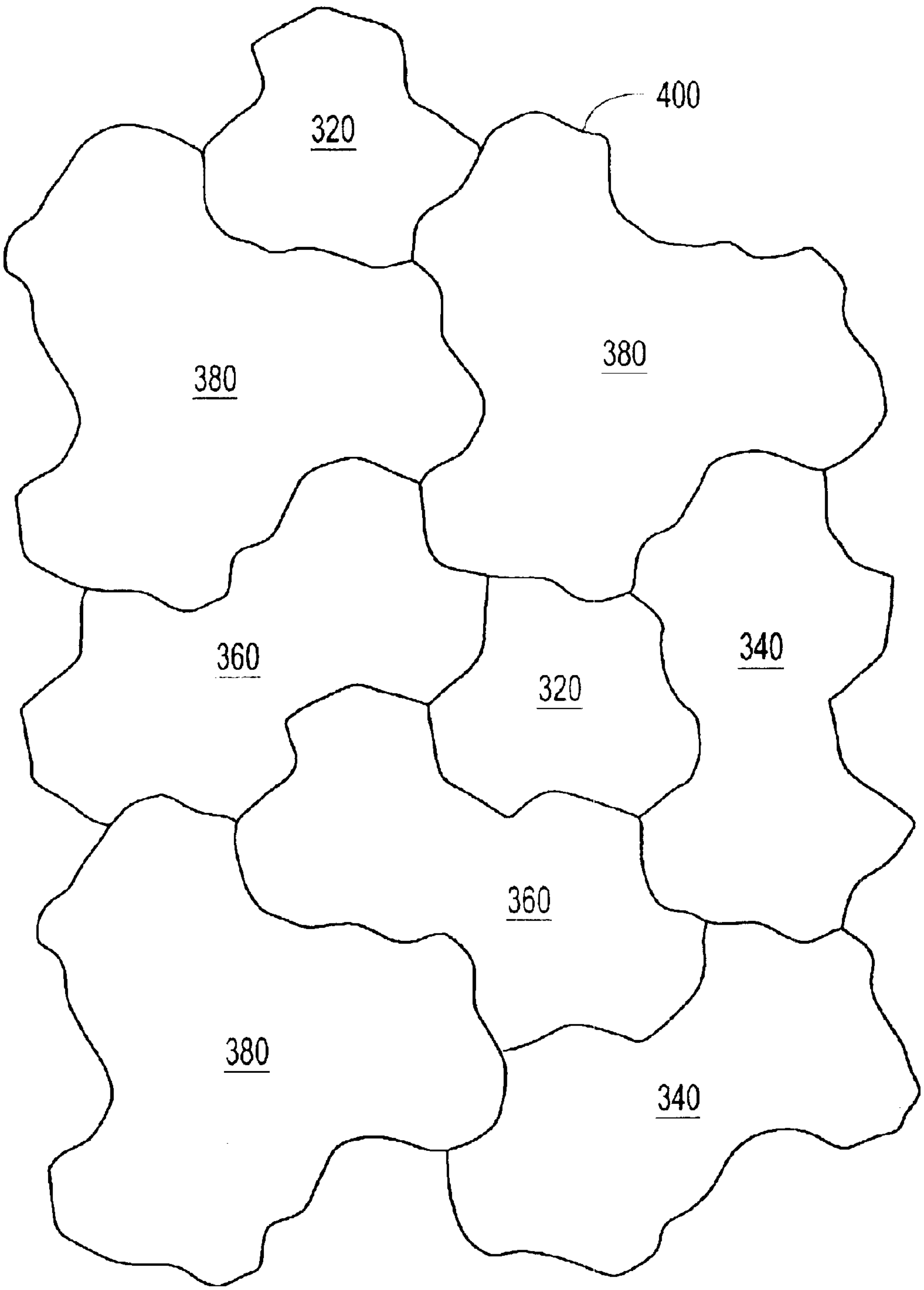

FIG. 27 illustrates a surface covering formed of a mixture of units 320, 340, 360 and 380. As with the other embodiments the surface covering appears to be natural, irregular and custom made.

The sum of the vertex angles in embodiments 2–4 are all 360 degrees.

| EMBODIMENT | ANGLE θ | ANGLE ϕ | ANGLE γ | TOTAL |
|---|---|---|---|---|
| 2 | 60 | 180 | 120 | 360 |
| 3 | 90 | 90 | 180 | 360 |
| 4 | 120 | 120 | 120 | 360 |

Other three vertex tessellations may be provided where each angle θ, ϕ and γ is evenly divisible into 360 degrees and the sum of the angles is 360 degrees. In embodiments one, two and three, the angles at the respective vertices are not the same. In contrast, the angles are all the same, namely 120 degrees, in embodiment four. Embodiments one, two and three, with different vertex angles, produce a more irregular and hence more natural looking unit, as compared to embodiment four which appears somewhat hexagonal. Accordingly, it is preferred that at least one of the vertex angles is different than one of the other vertex angles.

In accordance with the present invention, a wide variety of primary elements can be designed by those skilled in art. The present invention, defined in the appended claims, is not limited to the particular embodiments disclosed. These embodiments are illustrative, not limiting. Further it should be understood that the irregular lines that radiate from each vertex that are shown in the drawings are merely illustrative of the concept. The actual contours of each radially extending line is a matter of design choice and all configurations are within the scope of the appended claims. Provided, however, that sides 1–2, 3–4 and 5–6, respectively, are substantially rotational images of one another, as described above.

Figure 28:
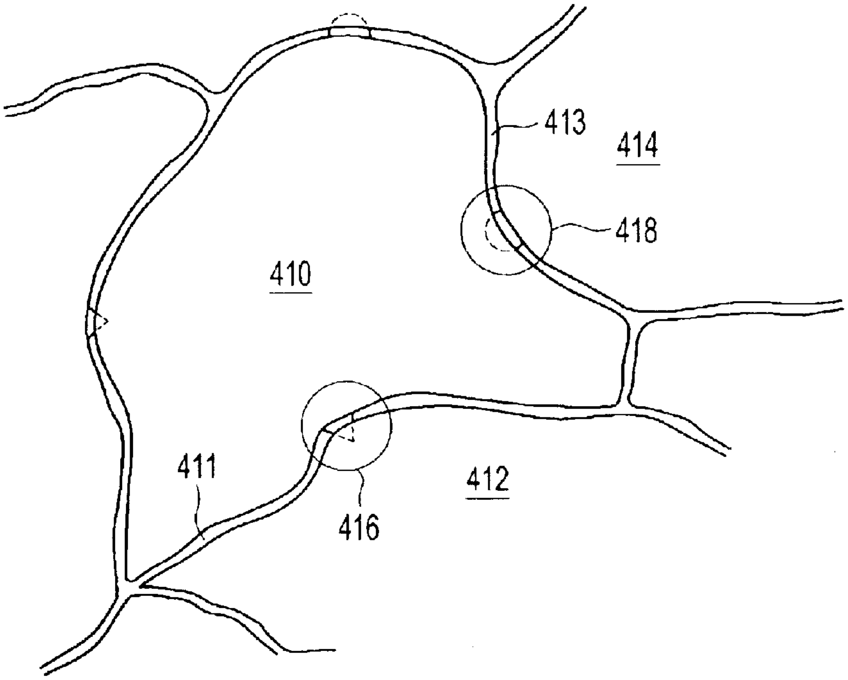
FIG. 28 is an enlarged plan view of a portion of a surface covering of one embodiment of the invention.
Figure 33:
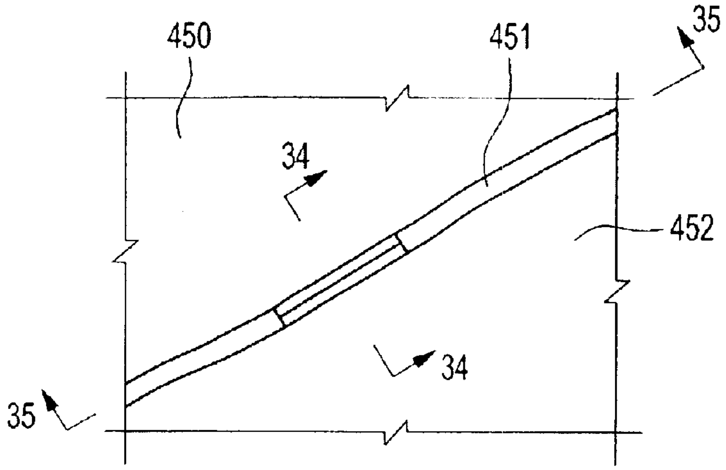
FIG. 33 is an enlarged plan view of a portion of a surface covering of the invention.

To further enhance the natural appearance of the surface covering it is desirable that the mating edges of adjacent units match less than perfectly, i.e., that the line or gap between units vary in thickness. This is preferably accomplished by introducing minor variations in the sides of the units so that the first and second sides are not identical. Likewise, there may be minor variations between the respective shapes of the third and fourth sides, and so on. Variations, however, cannot be so great as to cause problems in mating adjacent units. FIGS. 28 and 33 illustrate minor variations in the thickness of the gaps 411, 413 and 451 between adjacent units.

Figure 29:
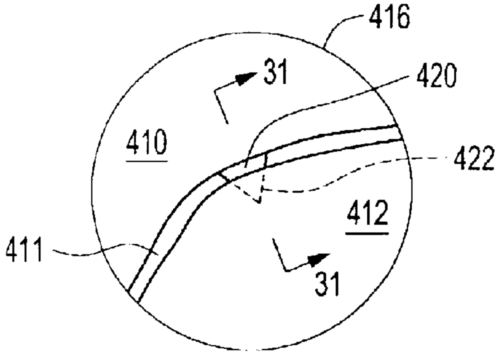
FIG. 29 is an enlarged plan view of a portion of FIG. 28.
Figure 30:
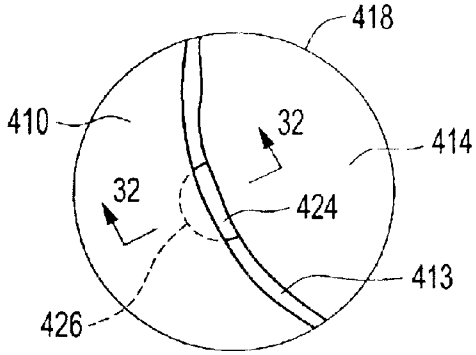
FIG. 30 is an enlarged plan view of a second portion of FIG. 28.
Figure 31:
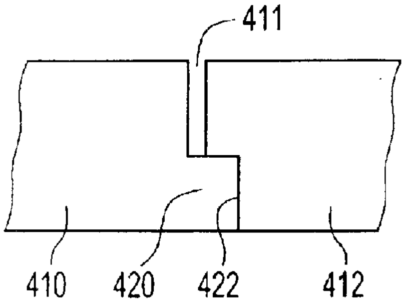
FIG. 31 is a cross-section taken along line 31-31 of FIG. 29.
Figure 32:
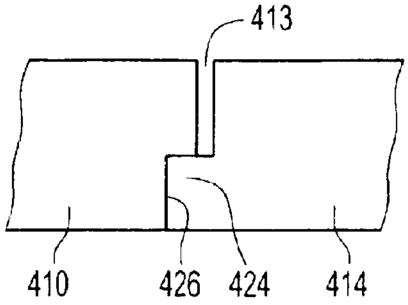
FIG. 32 is a cross-section taken along line 32-32 of FIG. 30.

A further aspect of the invention is the provision of indicia on the sides or bottom surfaces of units to assist in the construction of surface coverings. FIGS. 28–32 illustrate one embodiment of such indicia. FIG. 28 shows units 410, 412 and 414, with gaps 411 and 413 therebetween. FIG. 29 shows an enlarged view of area 416. FIG. 30 shows an enlarged view of area 418. FIGS. 28, 29 and 31 show a V-shaped projection 420 from a lower portion of the second side of unit 410 and a corresponding V-shaped recess 422 in the first side of unit 412. Similarly, FIGS. 28, 30 and 32 show a semi-circular projection 424 from a lower portion of the third side of unit 414 and a corresponding semi-circular shaped recess 426 in unit 410. The size and location of each mating projection-recess are uniformly located a consistent radial distance from the applicable vertex. The projections and recesses are preferably formed on the lower or inner portions of the units so that they will not be visible in the completed surface covering. Surface construction is facilitated by easily matching V-shaped projections and recesses, and semi-circular projections and recesses, respectively. It should be understood that the particular shape of the projections and recesses depicted in the drawings are merely illustrative and not limiting. The projections also function to maintain uniform spacing between adjacent units even when the thickness of the gaps 411, 413 vary. Proper spacing assists in maintaining the integrity of the surface over large areas.

Figure 34:
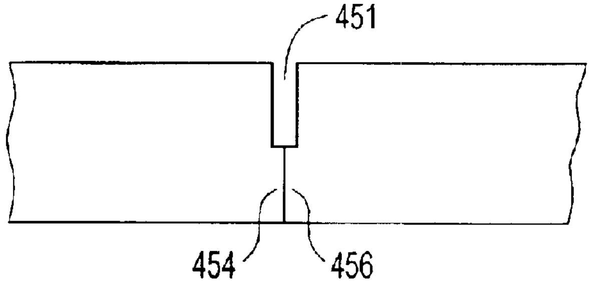
FIG. 34 is a cross-section taken along line 34-34 of FIG. 33.
Figure 35:
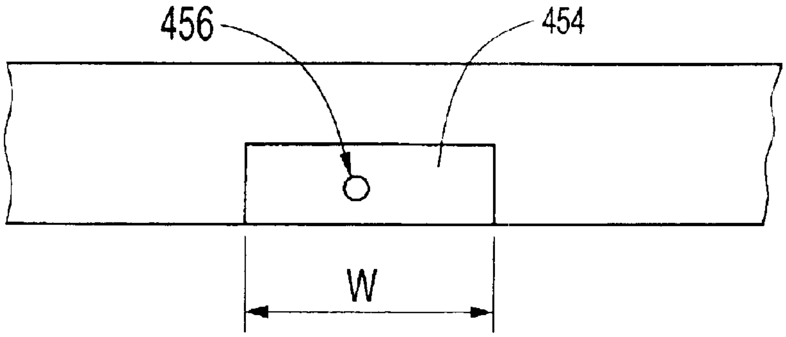
FIG. 35 is a cross-section taken along line 35-35 of FIG. 33.

FIGS. 33–35 illustrate another embodiment of indicia to facilitate construction of surface coverings. FIG. 33 is a plan view of two adjacent units 450 and 452 with gap 451 therebetween. Each unit includes a lug 454 and 456, respectively. Mating sides of respective units are desirably provided with lugs of the same size and location. Different mating sides are provided with lugs of a different width "W" or shape. Thereby, mating sides can be easily matched. As with the embodiment of FIGS. 28–32, the lugs function to maintain uniform spacing between members despite variations in the width of the gap 451. Optionally, the lugs may be provided with other indicia such as, letters, numbers or symbols to facilitate matching as shown for example at reference numeral 456 in FIG. 35.

To further improve the natural appearance of surface coverings it is desirable to provide variations in individual units. Dyes and colorants may be added to the units, and the color and quantity of dye may be regulated to produce color variations from unit to unit. Surface variations from unit to unit are also desirable. One method of introducing surface variation is to tumble the units after curing. Tumbled units and methods for tumbling are well known in the art. An alternative method is to hammer the surface of the unit to create small nicks or marks. Surface variations also may be made in the molds. For example, in a six form assembly, each mold can include a different surface irregularity or variation. Thereby, only every sixth unit would be the same.

The surface covering units of the invention may be made in any conventional manner, in the case of pavers, preferably by molding. There are two preferred paver molding methods, dry cast and wet cast. Dry cast material can be used to mass manufacture low cost pavers. Wet cast is more expensive, but produces very high quality pavers. A preferred dry cast method is slip-form molding from dry mix concrete to form pavers suited for use in walkways, driveways and patios.

In the wet cast process, a form is constructed with side walls conforming to the planar configuration of the unit (as discussed above) with a bottom of the form designed to mold what will be the outer or top surface of the unit. The paver is molded upside down by pouring a concrete mixture into the form and allowing it to cure. An advantage of the wet process is that natural stone materials and other desirable additives may be introduced that are not compatible with mass production by the dry cast process.

Another form of surface covering units of the invention comprises molding stamps, each stamp being comprised of one or more primary elements. Molding stamps are known to persons skilled in the art. Generally, a surface is formed by pouring, spreading and leveling concrete. While the surface is wet (uncured) molding stamps are pressed into the surface, the surface being molded to conform to the stamp. In forming a stamp molded surface at least one stamp is required, but preferably several stamps are used, including stamps of different sizes and/or shapes resulting from different combinations of primary elements. The stamp molds are aligned and mated one to another in the same manner as described above in reference to pavers. The finished surface has a natural stone appearance, but is actually a concrete slab.

While preferred embodiments of the invention have been herein illustrated and described, it is to be appreciated that certain changes, rearrangements and modifications may be made therein without departing from the scope of the invention as defined by the appended claims.

What is claimed is:

1. A surface covering unit comprised of x primary elements, wherein x is an integer equal to or greater than 2, each primary element being a rotational tessellation having a first side extending in a generally radial direction relative to a first vertex, said first side being irregularly shaped;

a second side extending in a generally radial direction relative to the first vertex and being rotationally spaced from said first side by a first angle of 60, 90, 120 or 180 degrees, said second side being substantially a rotational image of said first side;

a third side extending in a generally radial direction relative to a second vertex, the second vertex being spaced from the first vertex, and a fourth side extending in a generally radial direction relative to the second vertex and being substantially a rotational image of said third side and rotationally spaced therefrom by a second angle, wherein the sum of the first and second angles is 180, 240, 270 or 300 degrees.

2. A surface covering unit as in claim 1, wherein the first and second angles are equal.

3. A surface covering unit as in claim 1, wherein the first and second angles are not equal.

4. A surface covering unit as in claim 1, comprising at least three of said primary elements, at least two of said elements sharing a common first vertex and at least two of said elements sharing a common second vertex.

5. A surface covering unit as in claim 1, wherein said primary element further comprises a fifth side and a sixth side extending in a generally radial direction relative to a third vertex, said sixth side being substantially a rotational image of said fifth side, said fifth and sixth sides being rotationally spaced by a third angle, and where in the sum of the first, second and third angles is 360 degrees.

6. A surface covering unit as in claim 1, wherein said first side bears an indicia spaced a distance from the first vertex, and said second side bears a corresponding indicia spaced substantially the same distance from the first vertex.

7. A surface covering unit as in claim 1, wherein said first side bears a first indicia and said second side bears a corresponding indicia; and said third side bears a second indicia and said fourth side bears a corresponding indicia to said second indicia.

8. A surface covering unit, comprising a first side extending in a generally radial direction relative to a first vertex, said first side being irregularly shaped;

a second side extending in a generally radial direction relative to the first vertex and being rotationally spaced from said first side by a first angle of 60, 90, 120, or 180 degrees, said second side being substantially a rotational image of said first side;

a third side extending in a generally radial direction relative to a second vertex, the second vertex being spaced from the first vertex;

a fourth side extending in a generally radial direction relative to the second vertex, said fourth side being substantially a rotational image of said third side, said third and fourth sides being rotationally spaced by a second angle;

the sum of the first and second angles is 180, 240, 270 or 300 degrees, and wherein the first and second angles are not equal.

9. A surface covering unit as in claim 8, wherein the first angle is 60 degrees and the second angle is 180 degrees.

10. A surface covering unit as in claim 8, wherein the first angle is 60 degrees and the second angle is 120 degrees.

11. A surface covering unit as in claim 8, wherein the first angle is 90 degrees and the second angle is 180 degrees.

12. A collection of surface covering units, each unit comprised of x primary elements, where x is an integer equal to or greater than 1, and each said primary element being a rotational tessellation comprising a first side extending in a generally radial direction relative to a first vertex, said first side being irregularly shaped;

a second side extending in a generally radial direction relative to said first vertex and being rotationally spaced from said first side by a first angle of 60, 90, 120 or 180 degrees, said second side being substantially a rotational image of said first side;

a third side extending in a generally radial direction from a second vertex, said third side being irregularly shaped, said second vertex spaced apart from said first vertex;

a fourth side extending in a generally radial direction from said second vertex, said fourth side being substantially a rotational image of said third side, said fourth side being rotationally spaced from said third side by a second angle, the sum of the first and second angles being 180, 240, 270 or 300 degrees; and indicia on at least two sides of each said unit to facilitate matching adjacent units.

13. A collection of surface covering units as in claim 12 comprising a plurality of first units, each first unit comprised of at least one primary element; and a plurality of second units, each second unit comprised of at least two primary elements.

14. A collection of surface covering units as in claim 13 further comprising a plurality of third units, each said third unit comprised of at least three primary elements.

15. A collection of surface covering units as in claim 14 where in said at least three primary elements do not all share one common vertex.

16. A collection of surface covering units as in claim 12, wherein each said unit carries a first pair of said indicia and a different second pair of said indicia.

17. A surface covering formed of irregular units, comprising a multiplicity of first units and a multiplicity of second units assembled to form a continuous surface without overlap between units and without substantial gaps between units;

each said unit comprised of x primary elements, where x is an integer equal to or greater than 1, said first units comprising at least one primary element and said second units comprising at least two primary elements, the planar shape of said second units being different from said first units; and said primary element being a rotational tessellation having a first side extending in a generally radial direction relative to a first vertex, said first side being irregularly shaped;

a second side extending in a generally radial direction relative to the first vertex and being rotationally spaced from said first side by a first angle of 60, 90, 120 or 180 degrees, said second side being substantially a rotational image of said first side;

a third side extending in a generally radial direction from a second vertex, said third side being irregularly shaped, said second vertex spaced apart from said first vertex; and a fourth side extending in a generally radial direction from the second vertex, said fourth side being substantially a rotational image of said third side, said fourth side being rotationally spaced from said third side by a second angle, the sum of the first and second angles being 180, 240, 270 or 300 degrees.

18. A surface covering as in claim 17 comprising a multiplicity of third units, each said third unit formed of at least two primary elements and having a planar shape different from both said first units and said second units.

19. A surface covering as in claim 17 wherein some of said units have surface variations different for other ones of said units.

20. A surface covering as in claim 17 wherein some of said units have color variations different from other ones of said units.

21. A surface covering as in claim 17 wherein some of said units have edge variations different from other ones of said units.

* * * * *

US006881463C1

(12) EX PARTE REEXAMINATION CERTIFICATE (10071st)

United States Patent

Riccobene

(10) Number: US 6,881,463 C1

(45) Certificate Issued: Mar. 6, 2014

(54) IRREGULAR, ROTATIONAL TESSELLATION SURFACE COVERING UNITS AND SURFACE COVERING

(75) Inventor: Thomas S. Riccobene, Albuquerque, NM (US)

(73) Assignee: Goldman Sachs Lending Partners LLC, New York, NY (US)

Reexamination Request:
No. 90/012,493, Sep. 11, 2012

Reexamination Certificate for:

| | |
|---|---|
| Patent No.: | **6,881,463** |
| Issued: | **Apr. 19, 2005** |
| Appl. No.: | **10/395,537** |
| Filed: | **Mar. 24, 2003** |

(51) Int. Cl.

| | |
|---|---|
| ***E01C 5/00*** | (2006.01) |
| ***E04F 15/02*** | (2006.01) |
| ***B44C 3/12*** | (2006.01) |
| ***B44D 3/12*** | (2006.01) |
| ***E04C 1/39*** | (2006.01) |

(52) U.S. Cl.
CPC ................ *B44C 3/123* (2013.01); *B44D 3/122* (2013.01); *E01C 5/00* (2013.01); *E04C 1/395* (2013.01); *E04F 15/02* (2013.01)
USPC ................. 428/44; 428/48; 52/311.2; 404/41

(58) Field of Classification Search
None
See application file for complete search history.

(56) References Cited

To view the complete listing of prior art documents cited during the proceeding for Reexamination Control Number 90/012,493, please refer to the USPTO's public Patent Application Information Retrieval (PAIR) system under the Display References tab.

*Primary Examiner* — Terrence Till

(57) ABSTRACT

A surface covering unit comprises x primary elements, wherein x is an integer equal to or greater than 1. Each primary element is a rotational tessellation having a plural pairs of sides extending in a generally radial direction from plural vertices, respectively. In each pair, the two sides are rotationally spaced by an angle of 60, 90, 120 or 180 degrees, and each side is substantially a rotational image of the other side. The sum of the plural vertices angles is 180, 240, 270, 300 or 360 degrees. Preferably, all of the sides are irregularly shaped, but one or more sides could be wholly or partially straight. Optionally, one or more edges of each unit are marked with indicia to facilitate matching mating sides of adjacent units. A wide variety of units may be constructed having different numbers and arrangements of primary elements. As all the units are combinations of primary elements, they readily mate with each other. A surface covering comprises a multiplicity of surface covering units assembled to form a continuous surface without overlap between units and without substantial gaps between units. Because of the irregular side configurations, and different sizes and shapes of individual units, one can construct a continuous surface that has a natural, random and apparent custom appearance. Optionally, minor surface and edges variations are made from unit to unit to further enhance the natural appearance of the surface covering.

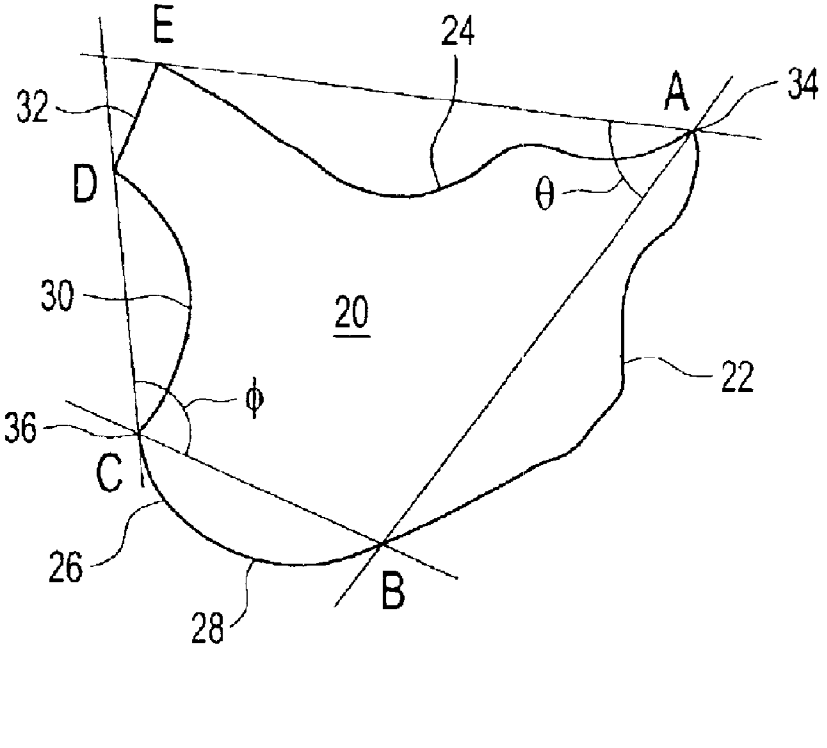

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 5 is cancelled.

Claims 1, 8, 12 and 17 are determined to be patentable as amended.

Claims 2, 4, 9, 10 and 18, dependent on an amended claim, are determined to be patentable.

Claims 3, 6, 7, 11, 13-16 and 19-21 were not reexamined.

1. A surface covering unit comprised of x primary elements, wherein x is an integer equal to or greater than 2, each primary element being a rotational tessellation having a first side extending in a generally radial direction relative to a first vertex, said first side being irregularly shaped;

a second side extending in a generally radial direction relative to the first vertex and being rotationally spaced from said first side by a first angle of 60, 90, 120 or 180 degrees, said second side being substantially a rotational image of said first side;

a third side extending in a generally radial direction relative to a second vertex, *said third side being irregularly shaped,* the second vertex being spaced from the first vertex[, and]*;* a fourth side extending in a generally radial direction relative to the second vertex and being substantially a rotational image of said third side and rotationally spaced therefrom by a second angle, wherein the sum of the first and second angles is 180, 240, 270 or 300 degrees*;*

*a fifth side extending in a generally radial direction relative to a third vertex, said fifth side being irregularly shaped, the third vertex being spaced from the first and second vertices; and*

*a sixth side extending in a generally radial direction relative to the third vertex and being substantially a rotational image of said third side and rotationally spaced therefrom by a third angle;*

*wherein the sum of the first, second and third angles is 360 degrees;*

*wherein the surface covering has a natural custom-fitted appearance such that a regular geometric pattern is not readily apparent.*

8. A surface covering unit, comprising a first side extending in a generally radial direction relative to a first vertex, said first side being irregularly shaped *and including at least one straight portion*;

a second side extending in a generally radial direction relative to the first vertex and being rotationally spaced from said first side by a first angle of 60, 90, 120, or 180 degrees, said second side being substantially a rotational image of said first side;

a third side extending in a generally radial direction relative to a second vertex, *said third side being irregularly shaped and including at least one straight portion,* the second vertex being spaced from the first vertex;

a fourth side extending in a generally radial direction relative to the second vertex, said fourth side being substantially a rotational image of said third side, said third and fourth sides being rotationally spaced by a second angle;

the sum of the first and second angles is 180, 240, 270 or 300 degrees, and wherein the first and second angles are not equal.

12. A collection of surface covering units, each unit comprised of x primary elements, where x is an integer equal to or greater than 1, and each said primary element being a rotational tessellation comprising a first side extending in a generally radial direction relative to a first vertex, said first side being irregularly shaped;

a second side extending in a generally radial direction relative to said first vertex and being rotationally spaced from said first side by a first angle of 60, 90, 120 or 180 degrees, said second side being substantially a rotational image of said first side;

a third side extending in a generally radial direction from a second vertex, said third side being irregularly shaped, said second vertex spaced apart from said first vertex;

a fourth side extending in a generally radial direction from said second vertex, said fourth side being substantially a rotational image of said third side, said fourth side being rotationally spaced from said third side by a second angle, the sum of the first and second angles being 180, 240, 270 or 300 degrees; and indicia on at least two sides of each said unit to facilitate matching adjacent units*,*

*wherein each said unit carries a first said indicia on one said side and a different second said indicia on another said side.*

17. A surface covering formed of irregular units, comprising a multiplicity of first units and a multiplicity of second units assembled to form a continuous surface without overlap between units and without substantial gaps between units;

*said first and second units having an irregular configuration and the surface covering having a natural custom-fitted appearance such that a regular geometric pattern is not readily apparent;* each said unit comprised of x primary elements, where x is an integer equal to or greater than 1, said first units comprising at least one primary element and said second units comprising at least two primary elements, the planar shape of said second units being different from said first units; and said primary element being a rotational tessellation having a first side extending in a generally radial direction relative to a first vertex, said first side being irregularly shaped;

a second side extending in a generally radial direction relative to the first vertex and being rotationally spaced from said first side by a first angle of 60, 90, 120 or 180 degrees, said second side being substantially a rotational image of said first side;

a third side extending in a generally radial direction from a second vertex, said third side being irregularly shaped, said second vertex spaced apart from said first vertex; and a fourth side extending in a generally radial direction from the second vertex, said fourth side being substantially a rotational image of said third side, said fourth side being rotationally spaced from said third side by a second angle, the sum of the first and second angles being 180, 240, 270 or 300 degrees.

* * * * *